United States Patent [19]

Minor

[11] 4,357,388

[45] Nov. 2, 1982

[54] HOT ROLL FUSER

[75] Inventor: James C. Minor, Boulder County, Colo.

[73] Assignee: International Business Machines Corporation, Armonk, N.Y.

[21] Appl. No.: 326,875

[22] Filed: Dec. 2, 1981

Related U.S. Application Data

[63] Continuation-in-part of Ser. No. 257,841, Apr. 27, 1981, abandoned, which is a continuation-in-part of Ser. No. 206,586, Nov. 13, 1980, abandoned.

[51] Int. Cl.[3] .......................... B32B 15/08; B21B 31/08

[52] U.S. Cl. .......................... 428/331; 29/132; 118/60; 219/469; 428/447; 428/450

[58] Field of Search .......................... 118/60; 432/60; 428/447, 450, 331; 219/469; 29/132

[56] References Cited

U.S. PATENT DOCUMENTS

| | | | |
|---|---|---|---|
| 3,419,593 | 12/1968 | Willing | 260/448.2 |
| 3,669,707 | 6/1972 | Donnelly | 29/132 |
| 3,795,033 | 3/1974 | Donnelly | 29/132 |
| 3,848,305 | 11/1974 | Jachimiak | 29/132 |
| 3,955,813 | 5/1976 | Edwards | 271/174 |
| 3,976,814 | 8/1976 | Murphy | 427/226 |
| 3,997,691 | 12/1976 | Murphy | 427/195 |
| 4,000,339 | 12/1976 | Murphy | 427/195 |
| 4,019,024 | 4/1977 | Namiki | 219/469 |
| 4,054,410 | 10/1977 | Murphy | 432/60 |
| 4,074,001 | 2/1978 | Imai | 428/329 |
| 4,075,390 | 2/1978 | Murphy | 428/307 |
| 4,107,389 | 8/1978 | Murphy | 428/447 |
| 4,126,722 | 11/1978 | Murphy | 428/339 |
| 4,188,423 | 2/1980 | Swift | 427/444 |

*Primary Examiner*—Ellis P. Robinson
*Attorney, Agent, or Firm*—Francis A. Sirr

[57] ABSTRACT

A xerographic hot roll fuser whose hot roll's soft, elastomeric outer surface is formed of a mixture of 70 parts polymethylvinylsiloxane where the vinyl groups are terminating groups, and 30 parts of a blended polymer consisting of the polymethylvinylsiloxane and polymethyl-H-siloxane in which the hydride function is greater than two.

5 Claims, No Drawings

HOT ROLL FUSER

RELATED APPLICATION

This application is a continuation-in-part of copending application Ser. No. 257,841 filed Apr. 27, 1981. That application, now abandoned, is a continuation-in-part of its copending application Ser. No. 206,586 filed Nov. 13, 1980 now abandoned.

TECHNICAL FIELD

The present invention relates to xerographic heat fusing devices known more specifically as hot roll fusers.

BACKGROUND OF THE INVENTION

The xerographic art has recognized that one of the most desirable devices to fuse dry particulate toner is a hot roll fuser. In a hot roll fuser a sheet of plain paper carries a resin-based toner image, and the toner directly contacts the hot surface of a heated roll, as this hot roll cooperates in pressure contact with a second (backup) roll to form a fusing nip.

In some instances, a portion of the toner image, now tackified by heat and pressure as it passes through the fusing nip, sticks or offsets to the surface of the hot roll. Later, and undesirable, this toner may partially transfer to the next sheet of paper as it passes through the fusing nip. This offset toner can also contribute to the occurrence of fuser wraps, i.e., a failure condition wherein the sheet's leading edge sticks to the hot roll on the downstream side of the fusing nip.

If such a failure occurs, the sheet wraps about the hot roll, and must be manually removed.

Various have been devised to assist in release of the sheet's leading edge from the hot roll.

U.S. Pat. No. 3,955,813 is an example of a pneumatic peeler bar for this purpose. In addition, the use of a soft fusing roll and a hard backup roll provides a fusing nip whose geometry tends to cause the sheet's leading edge to release from the soft hot roll. Aforementioned U.S. Pat. No. 3,955,813 is of this type.

These and other hot roll fusing problems led to the development of so-called wet release hot roll fusers wherein the hot roll cooperates with a relatively complex mechanism that functions to continuously supply a release oil, for example silicone oil, to the toner-engaging surface of the hot roll. These fusers are more expensive, require periodic maintenance of the oil applying mechanism, and require periodic addition of oil by the user. In addition, there may be a propensity of the hot roll's elastomeric surface material to swell as oil is absorbed.

These and other disadvantages of wet-release hot roll fusers led to refinement of the hot roll's elastomeric surface, and to the eventual commercial development of the so-called dry release hot roll fuser. U.S. Pat. No. 3,848,305 is exemplary of such a fuser. The hot roll of this patent comprises a cylindrical metal core whose major outer surface length is covered by a resilient RTV-60 silicone elastomeric material, wherein the content of volatile cyclic siloxane components have been reduced in a specified manner. RTV-60 is a brand of silicone rubber by General Electric Company. U.S. Pat. No. 4,188,423 purports to not only remove cyclic siloxanes from such a roll, but to also process the roll so as to remove other low molecular weight siloxanes, polysiloxanes and/or other impurities.

In addition to the use of RTV silicone rubber, as above mentioned, the prior art has recognized the use of LTV (low temperature vulcanization) silicone rubber, and HTV (high temperature vulcanization) silicone rubber.

A family of prior art patents also exists where dry release is said to be accomplished by the use of silicone rubber into which a catalytic agent is dispersed. This agent, in the presence of water or moisture, promotes the degradation of the silicone rubber at elevated temperatures, such that a degradation product is produced which itself is a release material for the hot, tackified toner. U.S. Pat. Nos. 3,976,814; 3,997,691; 4,000,339; 4,054,410; 4,075,390; 4,107,389 and 4,126,722 are of this type.

The dry release hot roll fuser of U.S. Pat. No. 4,019,024 provides a silicon rubber which is impregnated with silicon oil, the oil being in the form of so-called free oil.

A more complex rubber formulation is taught by U.S. Pat. No. 4,074,001 wherein RTV silicone rubber comprises a mixture of two diorganopolysiloxanes, one of which is terminated at the chain ends with high viscosity silanol groups, and the other of which is terminated at the chain ends with low viscosity trialkyl silyl groups. An alkoxysilane or a partial hydrolysis-condensate is the crosslinking agent, and metal salt of an organic acid is the reaction catalyst. Calcium carbonate, iron oxide and titanium dioxide are fillers, but substantially no siliceous fillers are used since it is said that siliceous fillers are harmful in the maintenance of the release property of the cured silicone rubber composition. U.S. Pat. Nos. 3,795,033 and 3,669,707, which themselves suggest the use of various silicone elastomers as a hot roll fuser release coating, support this teaching-away from the use of high surface energy fillers such as silica.

THE INVENTION

It has been found that a silicone resin, previously used as an encapsulant in the electronics industry, provides a superior dry release hot roll fuser elastomer when mixed in critical proportion to produce a critical cross-link density. Specifically, this resin is of the brand Sylgard 170 A and B silicone elastomer by Dow Corning Corporation. U.S. Pat. No. 3,419,593 describes this type elastomer and is incorporated herein by reference.

Sylgard 170 employs an addition-reaction curing process which produces no cure by-products, and does not contain volatile solvents. It is supplied as two separate liquid portions, part A and part B, of different colors. Literature describing its use recommends mixing parts A and B in equal amounts. The mixture cures to a solid at room temperature, but curing can be accelerated by the application of heat.

Part A is generically a polymethylvinylsiloxane polymer, where the vinyl groups are terminating groups. More specifically, Part A is $\alpha$, $\omega$-Bis-dimethylvinylsiloxy-polydimethylsiloxane. Its weight average angstrom molecular size is 313, and it has a polydispersity of 2.85. This weight average angstrom molecular size was determined by use of gel permeation chromatography (GPC), and is equivalent to a molecular weight average of 17,700. It comprises about 47.7% by weight of a 5 micron size filler of Min-U-Sil and a small amount of carbon black. (Min-U-Sil is a brand of high-purity, crystalline, mineral silica by Pennsylvania Glass Sand Corporation.) Part A also includes a small amount of an organic complex of platinum, as described in U.S. Pat. No. 3,419,593.

Part B is a blended polymer consisting of the aforementioned polymethylvinylsiloxane of Part A, and polymethyl-H-siloxane in which the hydride function is greater than two, and wherein the molecule is nonlinear. The polymethylvinylsiloxane has a weight average angstrom molecular size of 253 with a polydispersity of 4.21. The polymethyl-H-siloxane has a weight average angstrom molecular size of 65 with a polydispersity of 1.56. These two weight average molecular weights were also determined by the use of the GPC technique, and are equivalent to a molecular weight average of 14,200 for the polymethylvinylsiloxane, and a molecular weight average of 3,480 for the polymethyl-H-siloxane. The blended polymer comprises about 45% by weight of a 5 micron size Min-U-Sil filler.

Upon mixing parts A and B, the mixture cures due to the addition of the polymethylvinylsiloxane and the polymethyl-H-siloxane in the presence of part A's catalyst.

When Sylgard 170 is mixed at a critical ratio of about 70 parts A to 30 parts B, an elastomeric material results which provides a strong elastomer having very good hot roll fuser release properties, even at optical toner densities up to 1.4, while maintaining good fuse grade. Fuse grade is a measure of the permanency of the toner's adhesion to paper after fusing. The release properties of this 70 to 30 part material are maintained for a long period of use, and this material exhibits a stable elastic modulus, i.e. it provides constant fuser nip width and a subsequent constant fusing residence time with extended use.

The present invention is at least in part based upon the discovery, contra to the general teachings of the prior art, that a mineral silica filler provides the hot roll's elastomer surface with the required release properties and heat conductivity. This unexpected result may be due to the low surface energy property of mineral silica. Sylgard 170 contains such a filler and indeed provides very good release properties. However, when mixed in the recommended proportions, it was found that the resulting hot roll was physically weak. In other words, failures such as separation of pieces of elastomer from the hot roll's surface could occur during use or handling.

The critical proportioning of the material's two parts appears to change the material's crosslink density, and at the specified part A to part B ratio of about 70 to 30 the material's tensile strength peaks. At this peak, a suitably strong release material is achieved.

The after-curing crosslink density of the silicone resin is from 15 to $23\times10^{-5}$ mole crosslinks per gram.

Another most important advantage of this material is that its use produces a less expensive method of manufacture. This method specifically includes the steps of (1) cleaning the outer surface of the hot roll's aluminum core, (2) priming the clean surface, (3) centering the primed roller in a mold or holder having a cylindrical cavity and injecting the mixed Sylgard 170 into the holder at an exemplary low pressure such as 400 to 600 psi, (4) rapidly curing for about three minutes at 300° F. (5) removing the now-solid elastomer and its core from the mold, (6) post curing for one hour at 350° F., (7) cooling to ambient temperature, (8) grinding the outer Sylgard surface to a near-perfect circular cylinder having a surface roughness of about 8 to 12 micro-inches, and (9) inspecting the finished product.

More specifically, the cleaning step comprises first washing with an alkaline soap solution, rinse with water, followed by grit blasting, and finally vapor degreasing with a halogenated solvent. A brand of primer known as 1200 by Dow Corning Corporation is preferred but others may be used.

Adequate mixing of the parts A and B of Sylgard 170 can be observed by the blending of its two colors into a homogeneous single color. After mixing, the mixture is degreased in an adequate vacuum, an example of which is 20 inches of mercury for a five-minute time period. The mixture should now be used before it loses its flow property, such as within about one-half hour.

The thickness of the resulting elastomer coating is an exemplary 0.048 inch. The coating's tensile strength is about 600 psi, its elongation at breaking is about 90%, and its tear strength is about 14 pounds per inch.

Extended testing in photocopier machines has shown the invention to exhibit release properties superior to those of the dry release hot roll described by U.S. Pat. No. 3,848,305. After approximately 400,000 copies the invention allows for an additional 10° to 15° F. increase in hot roll operating temperature, at a specified toner density, before there becomes a significant exposure to fuser wraps. This safety margin then improves the reliability of the fuser.

While the invention has been particularly shown and described with reference to preferred embodiments thereof, it will be understood by those skilled in the art that various changes in form and details may be made therein without departing from the spirit and scope of the invention.

What is claimed is:

1. A fixing roll comprising a rigid core and an outer resilient elastomeric sleeve which is a mixture of about 70 parts by weight part A and about 30 parts by weight part B;

wherein part A is a polymethylvinylsiloxane polymer where the vinyl groups are terminating groups, and of a molecular weight average of about 17,700 and a polydispersity of about 2.85, and includes about 47.7% by weight of a finely divided mineral silica, and a small amount of an organic complex of platinum; and part B is a two-part polymer of said polymethylvinylsiloxane of a molecular weight average of about 14,200 and a polydispersity of about 4.21, and polymethyl-H-siloxane in which the hydride function is greater than two, and of a molecular weight average of about 3,480 and a polydispersity of about 1.56, and includes about 45% by weight of said finely divided mineral silica, the after-curing crosslink density of said sleeve being from 15 to $23\times10^{-5}$ mole crosslinks per gram.

2. The fixing roll of claim 1 wherein said polymethylvinylsiloxane is α, ω-Bis-dimethylvinylsiloxypolydimethylsiloxane, and wherein said polymethyl-H-siloxane is nonlinear.

3. The fixing roll of claim 1 or 2 wherein said mineral silica is of about 5 micron size.

4. The fixing roll of claim 1 or 2 wherein said mineral silica is of about 5 micron size, and wherein part A includes a small amount of carbon black.

5. The fixing roll of claim 1 or 2 wherein said elastomeric sleeve comprises the brand Sylgard 170 part A and part B.

* * * * *